(12) United States Patent
Marx

(10) Patent No.: US 6,262,843 B1
(45) Date of Patent: *Jul. 17, 2001

(54) POLARIZING PRIVACY SYSTEM FOR USE WITH A VISUAL DISPLAY TERMINAL

(75) Inventor: Adam N. Marx, Boulder, CO (US)

(73) Assignee: Qwest Communications Int'l, Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,260

(22) Filed: Dec. 31, 1997

(51) Int. Cl.$^7$ .................................................. G02B 27/28
(52) U.S. Cl. ........................ 359/501; 359/483; 359/900; 52/27; 52/36.1; 109/1 R; 109/10; 348/834; 348/835
(58) Field of Search ................................ 109/1 R, 2, 10, 109/11; 52/27, 36.1; 345/32; 348/834, 835, 841, 842, 832; 359/483, 485, 493, 501, 601, 900; 349/16

(56) References Cited

U.S. PATENT DOCUMENTS

| | | | | |
|---|---|---|---|---|
| 2,286,570 | * | 6/1942 | Pollack | 359/485 |
| 4,812,709 | * | 3/1989 | Dudasik | 358/252 |
| 4,826,245 | * | 5/1989 | Entratter | 297/217 |
| 4,926,327 | | 5/1990 | Sidley | 364/412 |
| 4,987,706 | * | 1/1991 | Hughes et al. | 52/79.5 |
| 5,072,999 | * | 12/1991 | Trotta et al. | 312/249 |
| 5,488,496 | | 1/1996 | Pine | 349/96 |
| 5,526,615 | * | 6/1996 | Kaizu et al. | 52/79.6 |
| 5,528,319 | * | 6/1996 | Austin | 348/835 |
| 5,615,623 | * | 4/1997 | Capraro, Jr. | 109/2 |
| 5,686,979 | * | 11/1997 | Weber et al. | 359/487 |
| 5,825,436 | * | 10/1998 | Knight | 349/16 |

FOREIGN PATENT DOCUMENTS

| | | | | |
|---|---|---|---|---|
| 402204770 A | * | 8/1990 | (JP) | 359/483 |
| 404358123 A | * | 12/1992 | (JP) | 359/501 |
| 405173127 A | * | 7/1993 | (JP) | 359/501 |
| 408313895 A | * | 11/1996 | (JP) | 359/501 |

* cited by examiner

Primary Examiner—Cassandra Spyrou
Assistant Examiner—John Juba, Jr.
(74) Attorney, Agent, or Firm—Marsh Fischmann & Breyfogle, LLP

(57) ABSTRACT

The privacy system apparatus and method of the present invention allow users of a publicly accessible terminal to privately access information displayed on a visual monitor of the terminal. In one embodiment, the privacy system 10 is implemented with a terminal 20 having a visual monitor 22 being disposed within a user area 50. The user area 50 provides a space for users 2 to privately access the terminal 20 and is at least partially separated from an external area 30 by a barrier assembly 40. A first filter 60 receives radiation 24 from the visual monitor 22 and transmits linearly polarized radiation 62 into the user area 50. A second filter 44 disposed between the user area 50 and the external area 30 transmits linearly polarized radiation 46. By selecting first and second filters, 60 and 44, respectively, with orthogonal transmission axes, radiation 24 emitted by the visual monitor 22 is substantially blocked from transmission to the external area 30.

20 Claims, 4 Drawing Sheets

POLARIZING PRIVACY SYSTEM FOR USE WITH A VISUAL DISPLAY TERMINAL

FIELD OF THE INVENTION

The present invention relates in general to operation of video terminals within kiosks or the like that are used to provide users access to passive or interactive video-related services such as access to the Internet, video games, and financial institutions. In particular, the present invention relates to a method and apparatus for limiting access to the video information in such an environment. The present invention is particularly useful in connection with terminals positioned in public or open locations, such as airport terminals, shopping malls, or open office spaces.

BACKGROUND OF THE INVENTION

The use of publicly accessible or open terminals with visual monitors has greatly increased in recent years. The public may use such a terminal, for example, to access the Internet to perform E-mail and other functions, to view television, movies, or other video programs, to play video games, to complete financial transactions, and to view personal information such as health records, personnel files, and retirement accounts. In many cases, the terminals have been used in areas open to the public, such as in airport terminals, shopping malls, and parking lots, and in areas open to select members of the public, such as hospitals lobbies and business offices. For a number of reasons, such terminals are often located in partitions, e.g., within partially or fully enclosed kiosks, booths, or the like or behind windows, screens, or other structures designed to allow individuals to view the terminal or user area and to allow users to view an area external to the partitions. For example, such partitions have included semi-enclosed, partial walls and fully-enclosed, transparent or windowed walls. In this manner, a measure of privacy is provided to the user while potential users can see the terminal area and determine if the terminal is available for their use. Similarly, users can see out of the privacy system to allow them to, for example, stay in visual contact with other people, their belongings, and potential users.

As can be appreciated, many users of the terminals would prefer substantially more privacy than provided by current practices. For example, a user may be uncomfortable completing financial transactions at terminals located in certain locations (e.g., secluded parking lots) where account balances or withdrawal amounts are displayed on the visual monitor in view of onlookers. An unscrupulous observer may be more likely to attempt a robbery of the user when the displayed balances are relatively large than when the observer cannot see the displayed information. Similarly, a user may desire more privacy if the terminal provides access to the Internet and the user wishes to conduct business activities involving confidential information or if the terminal provides access to and displays retirement account information or health records. Further, the terminal may provide access to information of an adult nature bringing about a need for protecting young observers by preventing them from seeing the information displayed on the visual monitor.

SUMMARY OF THE INVENTION

In view of the foregoing, it is an objective of the present invention to provide a privacy system, for use with a terminal, providing a high degree of privacy to a user of the terminal.

A related objective is to provide a user area, separate from an external area accessible by outside observers, in which a user may privately access information displayed on a visual monitor of a terminal. A further related objective is to inhibit or substantially prevent outside observers in the external area from viewing the information displayed on the visual monitor while allowing the outside observers to view the user located in the user area and allowing the users to see the external area.

These and other objectives are addressed by the privacy system of the present invention. Generally, the privacy system includes a structure defining a user area where the user can access a terminal, e.g., a fixed terminal or a portable terminal (e.g., a notebook computer, a laptop computer, or the like) placed in the user area by the user and further defines an external area separate from the user area. The structure includes a barrier to provide a degree of physical, visual, and/or auditorial privacy to a user of the terminal or protection against the elements. In this regard, during operation of the privacy system, the terminal is located behind or within the barrier. The barrier includes at least one wall, window, screen or partition which defines a user area in which the user may use the terminal. That is, the barrier at least partially separates the user area from an external area accessible to outside observers (e.g., other potential users of the terminal and members of the general public). For example, the barrier may include a window in a reception area of an office, a kiosk in a mall, of a booth located in a parking lot or other public area. The barrier is generally at least partially transparent to allow the outside observers to visually verify that the terminal is in use and allow the user in the user area to see the external area. The terminal includes a visual monitor which displays any information accessed through the terminal to the user located in the user area. To allow the user to privately access this displayed information, the privacy system substantially prevents radiation emitted from the visual monitor from being transmitted to the external area where outside observers might receive the radiation (e.g., the displayed information being transmitted in the form of visible light).

According to one aspect of the present invention, the privacy system uses a selective filter to prevent information displayed on a visual monitor of a terminal from being seen by observers in an external area outside the barrier. Generally, the privacy system includes a terminal with a visual monitor that allows a user to access information and a selective filter interposed between a user area and an external area for filtering the radiation transmitted by the monitor. The selective filter permits the user located in the user area (e.g., inside the barrier) to see the external area (e.g., outside the barrier) and permits observers in the external area to see into the user area without being able to see information displayed on the visual monitor of the terminal. To accomplish this selective filtering, various types of filters may be used including, for example, filters based on polarization or other optical phenomena. For example, the selective filter may include a polarizing sheet that transmits radiation having a particular axis of polarization and at least partially blocks radiation having other polarization states. At least a portion of any ambient light is transmitted by the selective filter allowing both the user and outside observers to see through the selective filter.

To prevent outside observers from viewing information on the visual monitor, the visual monitor transmits or is filtered to transmit radiation having a characteristic that is at least partially blocked by the selective filter, e.g., radiation having a polarization state which is different from a polarization state that is passed by the selective filter. In this regard, a monitor filter may be disposed between the visual monitor and the user area so as to transmit radiation having a specific characteristic, e.g., polarization state. For example, in the case where polarizing filters are used for the monitor filter and selective filter, a first axis of polarization of the monitor filter is preferably oriented at least 30 degrees relative to, and more preferably orthogonal to, a second axis of polarization of the selective filter. The monitor filter and/or the selective filter may include a mechanism (e.g., mechanical, electrical, or otherwise) for allowing the privacy system to be activated or deactivated as desired. For example, one or both of the filters can be selectively positionable from a first position in which the filter does not receive radiation emitted from the visual monitor to a second position in which the filter is interposed in a path of the monitor radiation between the visual monitor and the external area. In this manner, the visual monitor may be viewed by outside observers when the filter is in the first position (e.g., privacy system may be deactivated when the terminal is not in use) thereby allowing the terminal to be used to display information (e.g., commercials and displays providing the varied uses of the terminal) to outside observers when the terminal is not being used by a user.

In another aspect of the present invention, a method for providing privacy to a user of a publicly accessible terminal is achieved through the use of polarizers. A terminal with a visual monitor is positioned within a user area that is separated, at least partially, from an external area by a barrier. The barrier may include an at least partially transparent wall or a wall with a window for permitting users to see the external area and observers in the external area to see into the user area. The privacy system includes first and second polarizers which cooperatively block the radiation transmitted by the visual monitor from view by an outside observer in the external area. The first polarizer is disposed between the visual monitor and the user area. The first polarizer transmits radiation from the visual monitor having a first polarization state visible by the user. The second polarizer is positioned between the user area and the external area to receive radiation having the first polarization state. In this regard, the first and second polarizers may be linear polarizers that transmit radiation having a first and a second axis of polarization. Preferably the first axis of polarization is at an angle of at least 30 degrees relative to the second axis of polarization, and more preferably is orthogonal relative to the second axis of polarization. The radiation transmitted by the visual monitor is received by the first polarizer and transmitted to the user as linearly polarized radiation having a first axis of polarization. The second polarizer substantially blocks the linearly polarized radiation from the visual monitor because the second polarizer, to a significant degree, only transmits radiation at the differing second axis of polarization. By implementing this method for providing privacy, information displayed on the visual monitor is viewable within the user area but not in the external area.

In another aspect of the present invention, a privacy system is provided that includes a first polarizer positionable between a terminal monitor and a user area and a second polarizer positioned between the user area and an external area accessible to outside observers. The second polarizer includes a barrier positioned about the terminal monitor to provide physical privacy to the user. The barrier includes walls that are at least partially fabricated from a substantially transparent material, preferably glass, and more preferably plastic to reduce the manufacturing costs and to increase the durability of the barrier assembly. The walls are positioned at a distance about the terminal monitor to define a user area in which the user may confidentially access information on the visual monitor. The wall may be contiguously fabricated from plastic to provide the user with physical and auditory privacy from outside observers in the external area. The plastic is at least partially transparent or contains windows to allow the outside observers to see the user inside the user area and to allow the user to see outside observers in the external area.

To facilitate confidential access to the information displayed on the terminal monitor, the first polarizer includes a first filter for polarizing the radiation received from the terminal monitor into a first radiation having a first polarization state. The first radiation is then transmitted into the user area and received by the user. The first filter is preferably fabricated with a known axis of transmission from one or more pieces of linearly polarizing plastic and/or linearly polarizing glass. In this regard, the first polarization state of the first radiation is defined by a first axis of polarization established by the transmission axis of the first filter. In this manner, the first filter selectively absorbs components of the radiation emitted from the terminal monitor that are not substantially parallel to the first axis of polarization.

To prevent a substantial portion of the radiation emitted from the visual monitor from being transmitted to an external area, the second polarizer transmits second radiation having a second polarization state different from the first polarization state of the first radiation. The second polarizer may include a second filter preferably fabricated with a known transmission axis from one or more pieces of linearly polarizing plastic and/or linearly polarizing glass. The second polarization state of the second radiation is defined by a second axis of polarization established by the transmission axis of the second filter. In this manner, the second filter selectively absorbs components of radiation received from the user area and the external area that are not parallel to the second axis of polarization. To substantially absorb all components of the first radiation, the second filter preferably has a transmission axis that is at an angle greater than 30 degrees relative to the transmission axis of the first filter, and more preferably, that is orthogonal to the transmission axis of the first filter. In this regard, the privacy system provides the user of the terminal monitor confidential access to information by absorbing substantially all of the radiation emitted by the terminal monitor prior to it being transmitted to the external area.

DETAILED DESCRIPTION

Figure 1:
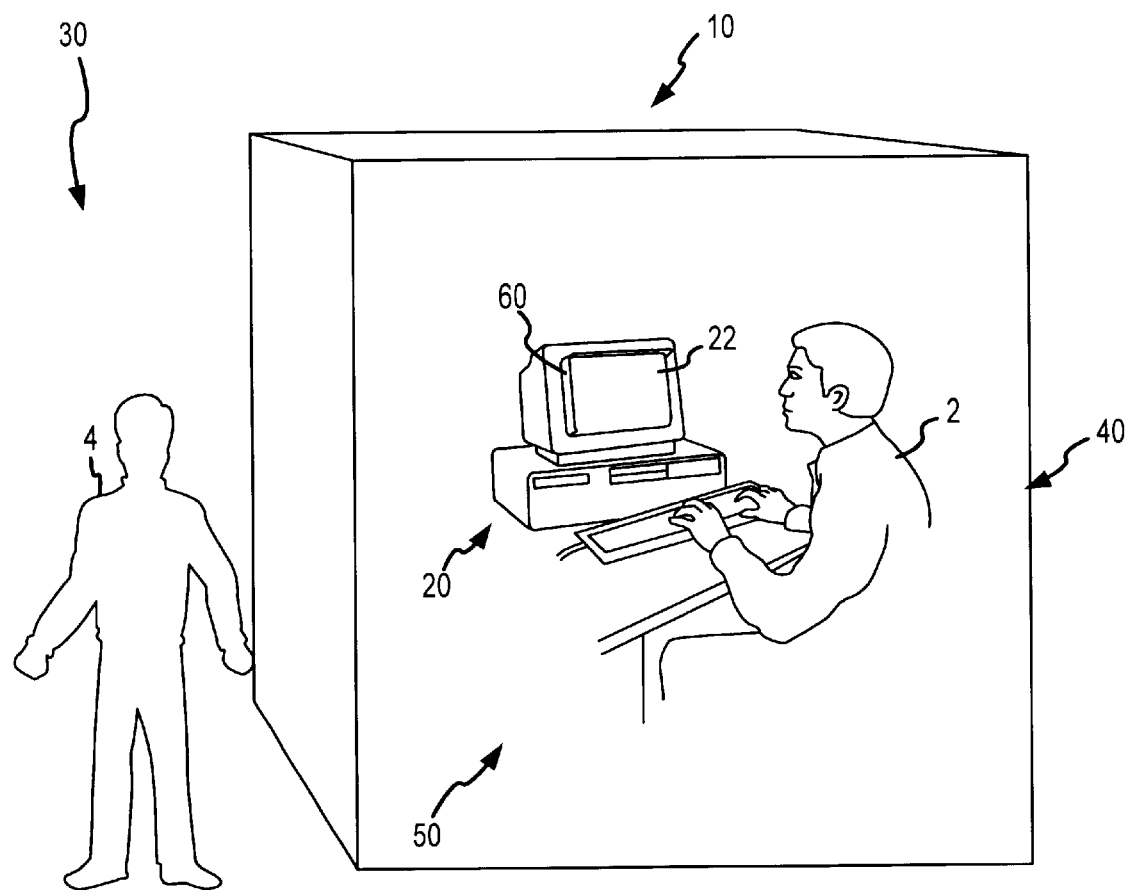
FIG. 1 illustrates a partial perspective view of a privacy system of the present invention.
Figure 2:
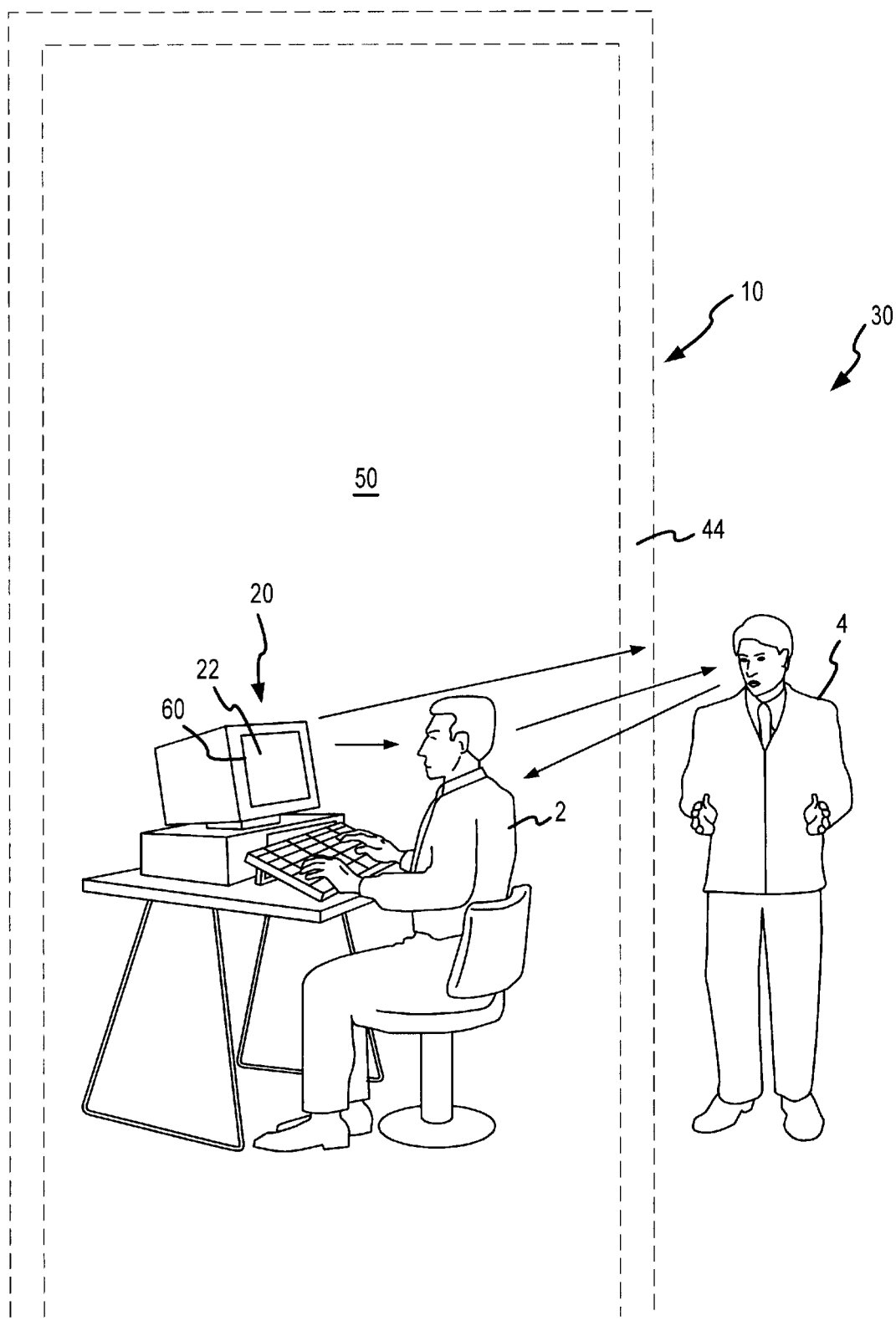
FIG. 2 is a perspective cross-section of a privacy system of the present invention.
Figure 3:
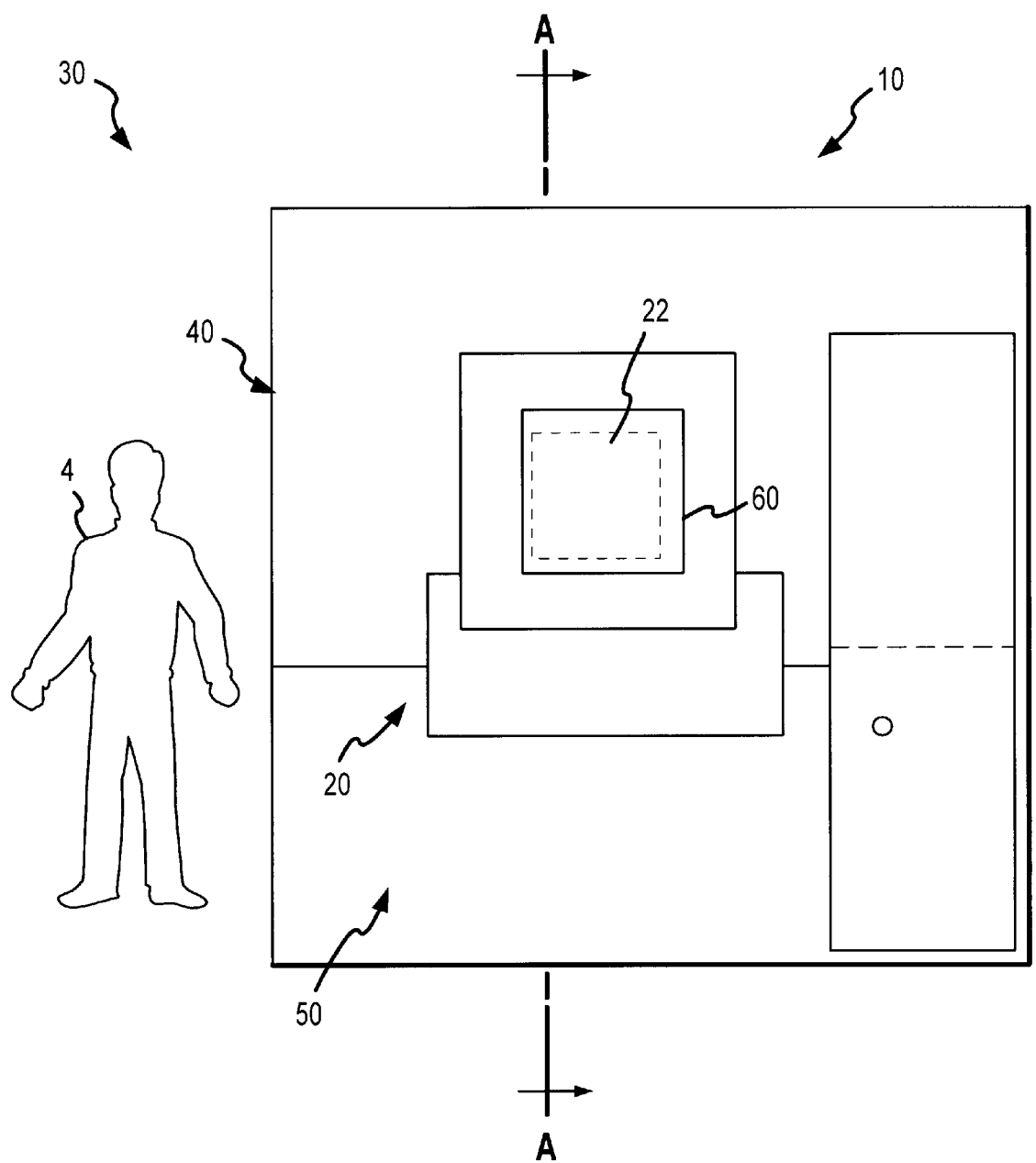
FIG. 3 is a side view of an embodiment of a privacy system of the present invention.

In the following description, the invention is set forth in the context of a particular embodiment of a privacy system for use with a terminal accessible by all, or select, members of the general public. Although it will be appreciated that certain aspects of the present invention are readily applicable to other embodiments, for the sake of completeness, one illustrative embodiment of the invention is described in detail below.

FIGS. 1–4 pertain to an embodiment of a privacy system 10. Generally, the privacy system 10 of the present invention includes a terminal 20 disposed within a user area 50, a barrier assembly 40 that separates the user area 50 from an external area 30, and first and second filters, 60 and 44, respectively, for preventing an outside observer 4 in the external area 30 from viewing information accessed by a user 2. In this regard, the terminal 20 provides a user 2 with access to information (e.g., information from Internet access). The terminal 20 includes a visual monitor 22 for displaying the information to the user 2. As can be appreciated, the terminal 20 may have various configurations to support interactive and passive uses which may include, for example, making financial transactions, accessing medical, financial, or other confidential records, viewing movies, playing video games, and accessing the Internet. In this regard, the visual monitor 22 may at least partially consist of, for example, a cathode ray tube device, a liquid crystal display device, a passive matrix device, an active matrix device, or a flat screen display device depending upon considerations including cost, durability, size requirements, and intended uses of the terminal 20. To support this wide range of uses, the terminal 20 may be interconnected with a remote host computer (not shown) via a public or private communications network. Although the illustrated terminal 20 is a typical personal computer terminal, it will be appreciated that any number of terminals configured for predetermined uses may be used in connection with the privacy system 10 of the present invention. As can be appreciated, the terminal 20 may also be a portable computer (e.g., notebook computer) that is provided by the user 2.

The privacy system 10 further includes a barrier assembly 40 for at least partially physically enclosing the terminal 20 to provide the user 2 with an amount of privacy while using the terminal 20. In this regard, the illustrated barrier assembly 40 includes walls 42 disposed about the terminal 20 for enhancing the physical privacy provided to the user 2. The barrier assembly 40 may also be configured with windows, partial walls, and other structures to fit the use and location of the privacy system 10. The walls 42 are positionable for defining a user area 50 that is separated from an external area 30 accessible to outside observers 4. The user area 50 is configured so that the user 2 may comfortably use the terminal 20 (e.g., sitting in an interactive video game chair). Although only one user 2 is shown, the user area 50 may readily be enlarged to facilitate multiple users 2 (e.g., for playing video games and tele-conferencing via the Internet) by varying the positioning of the walls 42 of the barrier assembly 40. Similarly, the cross-sectional shape of the user area may be altered from the illustrated rectangular cross-sectional shape as needed to accommodate the intended use of the terminal 20.

Generally, it is desirable for the outside observers 4 (e.g., potential users) to be able to visually observe when the terminal 20 is in use and, similarly, for users 2 to be able to see outside observers 4 and other objects located in the external area 30. In this regard, the walls 42 may be at least partially fabricated from a transparent material (e.g., glass and plastic) to allow users 2 to see out of the user area 50 and to allow outside observers 4 to see into the user area 50. Because the transparent portions of the walls 42 fail in blocking the outside observers 4 in the external area 30 from seeing information displayed to the user 2 in the user area 50 on the visual monitor 22, the user 2 may demand that the information displayed on the visual monitor 22 of the terminal 20 be blocked from the view of the outside observers 4 in the external area 30 in a manner that allows the user 2 to see the external area 30.

Figure 4:
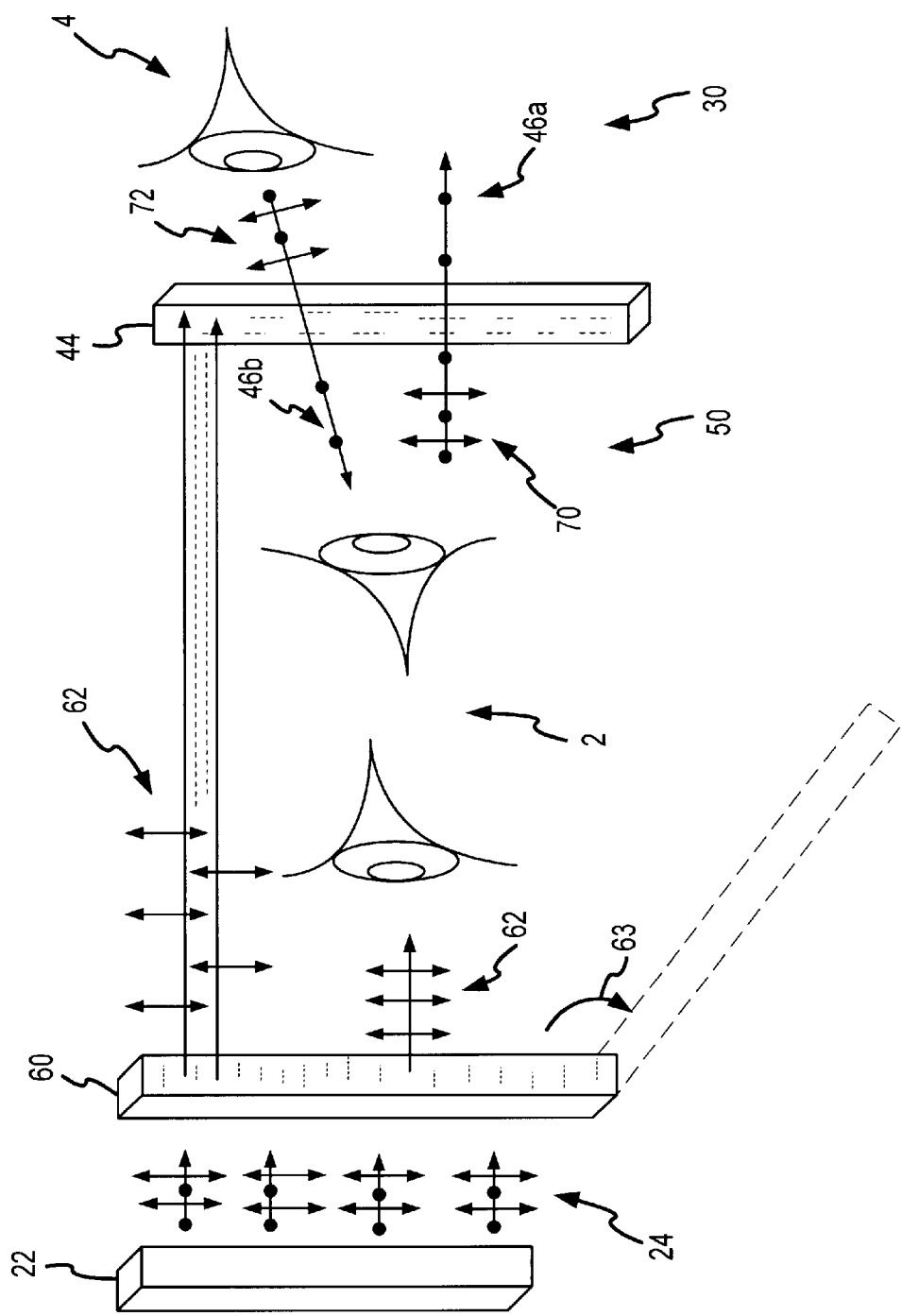
FIG. 4 is a partial cross-sectional view of the privacy system illustrated in FIG. 3 taken at line A—A.

To enhance private access to information displayed on the visual monitor 22, the privacy system 10 includes a first filter 60 and a second filter 44. As illustrated in FIG. 4, the first filter 60 is positioned between the visual monitor 22 of the terminal 20 and the user area 50 to selectively filter radiation emitted from the visual monitor 22. In this regard, the first filter 60, as illustrated, is positioned immediately adjacently to the visual monitor 22 and is configured to be at least the same size as, and preferably larger than, the visual monitor 22 to facilitate the selective filtering of substantially all of the radiation 24 emitted from the visual monitor 22 into the user area 50. The first filter 60 generally acts as a polarizer and, in this regard, may be substantially fabricated from materials configured to transmit radiation 62 having a first polarization state. As illustrated, the first filter 60 is fabricated from one of linearly polarizing glass and linearly polarizing plastic.

As illustrated in FIG. 4, the second filter 44 is positioned between the user area 50 and the external area 30 to selectively filter radiation transmitted from the user area 50 to the external area 30. To facilitate this filtering, the second filter 44 may be positioned adjacently to the walls 42 of the barrier assembly 40. To further enhance the user's 2 privacy (e.g., filtering of all radiation transmitted to external area 30), the second filter 44 is configured so as to receive all radiation 46 transmitted through the transparent portions of the walls 42. The second filter 44 generally acts as a polarizer and, in this regard, may be substantially fabricated from materials configured to transmit radiation 46 having a second polarization state. As illustrated, the second filter 44 is fabricated from one of linearly polarizing glass and linearly polarizing plastic. In another embodiment, the walls 42 may be fabricated from one of linearly polarizing glass and linearly polarizing plastic to function as the second filter 44 of the privacy system 10 (e.g., act as a polarizer to transmit radiation 46 having a second polarized state).

During operation of the privacy system 10 of the present invention, the user 2 may enter the user area 50 through an opening (e.g., a door) in the barrier assembly 40. The user 2 may manipulate the terminal 20 to access information on the visual monitor 22. The visual monitor 22 emits radiation 24 (e.g., displays information accessed by the user 2) that is visible by the user 2. In this regard, the radiation 24 emitted by the visual monitor 22 may be in the form of unpolarized light which is illustrated in FIG. 4 through the use of the array of short arrows and dots. The radiation 24 emitted by the visual monitor 22 is received by the first filter 60 and is transmitted to the user 2 located in the user area 50 as first radiation 62 having a first polarization state. The first polarization state of the first radiation 62 may be partially defined by a first axis of polarization. As illustrated in FIG. 4, the first filter 60 is configured to transmit first radiation 62 having a first axis of polarization that is substantially parallel to a vertical axis of the first filter 60 (e.g., substantially all radiation, except radiation vibrating in a plane parallel to a vertical plane of the first filter 60, has been filtered from the radiation 24 by the first filter 60). In this manner, the user 2 may receive information from the terminal 20 in the form of linearly polarized first radiation 62 transmitted from the first filter 60 into the user area 50.

The linearly polarized first radiation 62 is transmitted through the user area 50 and received by the second filter 44. The second filter 44 is transmits second radiation 46 having a second polarization state differing from the first polarization state of the first radiation 62. The second polarization state of the second radiation 46 may be partially defined by a second axis of polarization. As illustrated in FIG. 4, when unpolarized radiation 70 emitted from a source (not shown) in the user area 50 is received by second filter 44, the radiation 70 is at least partially filtered by second filter 44, and second filter 44 transmits second radiation 46a having a second polarization state to the external area 30. The second axis of polarization is substantially perpendicular to a vertical axis of the second filter 44 so that radiation in a plane perpendicular to a vertical axis of the second filter 44 is transmitted by the second filter 44. In this regard, outside observers 4 may observe objects (e.g., the user 2) in the user area 50 by receiving the linearly polarized second radiation 46a. Similarly, unpolarized radiation 72 emitted in the external area 30 may be received by the second filter 44 and transmitted as linearly polarized second radiation 46b. The user 2 receives the linearly polarized second radiation 46b and is able to see outside observers 4 located in the external area 30.

When the first radiation 62 is received by the second filter 44, the first radiation 62 is substantially blocked (e.g., filtered) by the second filter 44 from being transmitted out of the privacy system 10. In the illustrated embodiment of the privacy system 10, the first axis of polarization of the first radiation 62 is orthogonal to the second axis of polarization of the second radiation 46a that is transmitted by second filter 44. The first filter 60 and the second filter 44 effectively cross-polarize (e.g., filter radiation in two perpendicular planes) the radiation 24 emitted by the visual monitor 22 thereby preventing the outside observers 4 from receiving the information accessed by the user 2 and displayed on the visual monitor 22 of the terminal 20. Although, as illustrated, the first and second axes of polarization are orthogonal, substantial blocking of the radiation 24 may be achieved in embodiments of the privacy system 10 where the first axis of polarization is selected to be at an angle greater than about thirty (30) degrees relative to the second axis of polarization.

It is often desirable to display information (e.g., advertising) on the visual monitor 22 to outside observers 4 in the external area 30 during periods when the terminal 20 is not in use. Accordingly, the privacy system 10 of the present invention is preferably designed so that it can be activated and deactivated as desired. Any appropriate mechanical, electrical, or other mechanism may be used in this regard. For example, either, or both, the first and second filters 60, 44 may be movable to allow the outside observers 4 to view the visual monitor 22, i.e., to provide a pathway for radiation 24 from the visual monitor 22 to reach the external area 30 without being blocked due to passing through cross-polarized filters. In one embodiment, the first filter 60 is selectively movable, as generally indicated by arrow 63, between a first position (as shown at item 60 in FIG. 4) that is selected when the terminal 20 is not in use by a user 2 and a second position that is selected when a user 2 is using the terminal 20 for a private use. In this regard, the first filter 60 may be manually moved by the user 2 when the user 2 desires privacy or, as can be appreciated, moved by a self- or user-actuated filter positioning device (not shown). The first position for the first filter 60 is selected so that the radiation 24 emitted from the visual monitor 22 is received by the second filter 44 without first being selectively filtered by the first filter 60. The second position for the first filter 60 is selected so that the radiation 24 emitted from the visual monitor 22 is selectively filtered by the first filter 60 (as described in detail above). By moving the first filter 60 between the first and second positions, the privacy system 10 is operable to substantially block the radiation 24 emitted from the visual monitor 22 while the terminal 20 is in use by a user 2 while allowing the radiation 24 to be transmitted to an outside observer 4 as visible radiation when the terminal 20 is not in use.

While various implementations of the present invention have been described in detail, it is apparent that further modifications and adaptations of the invention will occur to those skilled in the art. However, it is expressly understood that such modifications and adaptations are within the spirit and scope of the present invention.

What is claimed is:

1. An apparatus for providing privacy comprising:

a computer terminal which includes a visual monitor for displaying information, wherein said visual monitor includes a first polarizing means for selectively passing a first radiation from said visual monitor having a first polarization state, said first polarizing means being disposed proximate to and extending across at least a portion of said monitor;

a barrier assembly within which a user area is defined and the visual monitor and first polarizing means are locatable, wherein the barrier assembly is substantially opaque and includes at least one substantially transparent window which allows for viewing of the user area from outside the barrier assembly;

a second polarizing means disposed proximate to and extending across the window for selectively passing a second radiation and blocking the first radiation emitted from the visual monitor, wherein said second radiation is employable to illuminate the user area as viewed through the second polarizing means from the outside of the enclosure; and wherein said first radiation having said first polarization state is transmittable to the user located within said user area to allow information from said visual monitor to be privately accessed and said second radiation having said second polarization state is transmittable within said user area for allowing the user to see the outside observers and the outside observers to see the user.

2. An apparatus, as recited in claim 1, wherein said first radiation transmitted by said first polarizing means has a first axis of polarization and said second radiation transmitted by said second polarizing means has a second axis of polarization, said first axis of polarization being substantially orthogonal to said second axis of polarization.

3. An apparatus, as recited in claim 1, wherein said first radiation transmitted by said first polarizing means has a first axis of polarization and said second radiation transmitted by said second polarizing means has a second axis of polarization, said first axis of polarization being at an angle greater than about 30 degrees relative to said second axis of polarization.

4. An apparatus, as recited in claim 1, wherein said first polarizing means comprises first filter for filtering radiation transmitted through said first filter into said first polarization state, said first filter being constructed of one of linearly polarizing glass and linearly polarizing plastic.

5. An apparatus, as recited in claim 1, wherein said visual monitor is configured for predetermined interactive uses, said predetermined interactive uses selected from a group of uses consisting of completing financial transactions, playing video games, accessing the Internet, viewing movies, viewing television, viewing financial information, accessing personal records, displaying pay phone transactions, and accessing medical information.

6. An apparatus, as recited in claim 1, said apparatus further comprising:

means, associated with at least one of said first and second polarizing means, for selectively switching said at least one of said first and second polarizing means from a first to a second operating state;

wherein said first operating state allows visible radiation emitted from said visual monitor to be transmitted into said external area to the outside observers and said second operating state substantially blocks visible radiation from said visual monitor from being transmitted to said external area.

7. An apparatus, as recited in claim 6, wherein said means for selectively switching comprises means for positioning said at least one of said first and second polarizing means between a first position selected so that radiation emitted from said visual monitor is transmitted to said external area via a first path that traverses no more than one of said first and second polarizing means and a second position wherein radiation is transmitted from said visual monitor to said external area via a second path that traverses both said first and second polarizing means.

8. A method of providing privacy comprising:

positioning a first polarizing means proximate to and extending across at least a portion of a visual monitor included in a computer terminal, for selectively passing a first radiation from said visual monitor having a first polarization state;

enclosing the visual monitor in a barrier assembly so as provide a user area within said barrier assembly for viewing the visual monitor;

incorporating a window in the barrier assembly such that the user area is viewable from outside the barrier assembly; and providing a second polarizing means interposed proximate to and extending across the window for selectively passing a second radiation not emitted from the visual monitor and having a second polarization state different from said first polarization state, said second polarizing means being interposed between the user area and the outside of the barrier assembly.

9. A method, as recited in claim 8, wherein said first radiation transmitted by said first polarizing means has a first axis of polarization and said second radiation transmitted by said second polarizing means has a second axis of polarization, said first axis of polarization being substantially orthogonal to said second axis of polarization.

10. A method, as recited in claim 8, wherein said first radiation transmitted by said first polarizing means has a first axis of polarization and said second radiation transmitted by said second polarizing means has a second axis of polarization, said first axis of polarization being at an angle greater than about 30 degrees relative to said second axis of polarization.

11. A method, as recited in claim 8, wherein said first polarizing means comprises a first filter for filtering radiation transmitted through said first filter into said first polarization state, said first filter being constructed of one of linearly polarizing glass and linearly polarizing plastic.

12. A method, as recited in claim 11, wherein said barrier assembly comprises a second filter for filtering radiation transmitted through said second filter into said second polarization state, said second filter being constructed from one of linearly polarizing glass and linearly polarizing plastic.

13. An apparatus for providing privacy comprising:

a computer terminal which includes a computer display, where the computer display includes a first polarizing means for selectively polarizing light emitted from the computer display according to a first polarization state;

a barrier assembly which includes an enclosure within which the computer display is positioned and which defines a user area therein; and a second polarizing means incorporated into the barrier assembly which provides for selective transmission of light having a second polarization state so that said user area is viewable from outside the barrier structure, wherein said first polarizing means has a first axis of polarization and said second polarizing means has a second axis of polarization where said first axis of polarization is substantially orthogonal to said second axis of polarization.

14. The apparatus as recited in claim 13, wherein said first polarizing means comprises a first filter for filtering radiation through said first filter into said first polarization state, said first filter being constructed of one of linearly polarizing glass and linearly polarizing plastic.

15. The apparatus as recited in claim 14, wherein said barrier assembly comprises a second filter for filtering radiation transmitted through said second filter into said second polarization state, said second filter being constructed from one of linearly polarizing glass and linearly polarizing plastic.

16. The apparatus as recited in claim 13, wherein said barrier assembly is substantially transparent to allow a user positioned within said enclosure to see through said barrier assembly and to allow outside observers positioned outside the barrier assembly to see through said barrier to see the user within said enclosure.

17. The apparatus as recited in claim 13, further comprising means, associated with at least one of said first and second polarizing means, for selectively switching said at least one of said first and second polarizing means from a first to a second operating state:

wherein said first operating state allows visible radiation emitted from said computer display to be transmitted outside the barrier assembly and said second operating state substantially blocks visible radiation from said computer display from being transmitted to the outside.

18. The apparatus as recited in claim 17, wherein said means for selectively switching comprising means for positioning said at least one of said first and second polarizing means from a first position selected so that radiation emitted from said computer display is transmitted to the outside via a first path that traverses no more than one of said first and second polarizing means and a second position wherein radiation is transmitted from said computer display to said external area via a second path that traverses said first and second polarizing means.

19. The apparatus as recited in claim 13, wherein the computer display is configured for predetermined interactive uses, said predetermined interactive users selected from a group of users consisting of completing financial transactions, playing video games, accessing the Internet, viewing movies, viewing television, viewing financial information, accessing personal records, displaying payphone transactions, and accessing medial information.

20. The apparatus as recited in claim 13, wherein the computer display comprises one of a cathode ray tube device, a liquid crystal display device, a passive matrix device, an active matrix device, and a flat screen display device.

* * * * *